(12) United States Patent
Regev

(10) Patent No.: US 6,450,402 B1
(45) Date of Patent: *Sep. 17, 2002

(54) IDENTIFICATION DEVICE

(75) Inventor: Eyal Regev, Kfar Shmaryahu (IL)

(73) Assignee: T.I.D. (The Identifying Diamond) Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/407,977

(22) Filed: Sep. 29, 1999

Related U.S. Application Data

(63) Continuation-in-part of application No. 09/304,853, filed on May 5, 1999.

(30) Foreign Application Priority Data

Jun. 27, 1999 (IL) .................................................. 130661

(51) Int. Cl.$^7$ ................................................ G06F 17/00
(52) U.S. Cl. ........................................ 235/375; 235/487
(58) Field of Search .......................... 235/375, 462.01, 235/1.03, 462.13, 487, 491, 492, 493, 900; 219/121.68; 125/30.01; 705/1, 500

(56) References Cited

U.S. PATENT DOCUMENTS

| | | |
|---|---|---|
| 1,700,497 A | 1/1929 | Heitzler |
| 1,799,604 A | 4/1931 | Read |
| 3,740,142 A | 6/1973 | Takubo |
| 3,947,120 A | 3/1976 | Bar-Issac et al. |
| 4,012,141 A | 3/1977 | Hanneman |
| 4,125,770 A | 11/1978 | Lang |
| 4,200,506 A | 4/1980 | Dreschhoff et al. |
| 4,316,385 A | 2/1982 | DeVries et al. |
| 4,354,189 A * | 10/1982 | Lemelson ................. 340/5.61 |
| 4,392,476 A | 7/1983 | Gresser et al. |
| 4,467,172 A | 8/1984 | Ehrenwald et al. |
| 4,707,592 A | 11/1987 | Ware |
| 4,749,847 A * | 6/1988 | Despres ..................... 235/487 |
| 4,799,786 A | 1/1989 | Gerrard |
| 4,900,147 A | 2/1990 | Bowley et al. |
| 4,931,629 A | 6/1990 | Frankfurt |
| 5,118,181 A | 6/1992 | Yifrach et al. |
| 5,124,935 A | 6/1992 | Wallner et al. |
| 5,233,703 A * | 8/1993 | Galka ....................... 2/209.13 |
| 5,379,102 A | 1/1995 | Takeuchi |
| 5,410,125 A | 4/1995 | Winston et al. |
| 5,485,312 A | 1/1996 | Horner et al. |
| 5,677,521 A | 10/1997 | Garrou |
| 5,828,405 A | 10/1998 | Vanier et al. |
| 5,932,119 A | 8/1999 | Kaplan et al. |
| 6,308,891 B1 * | 10/2001 | Regev .................... 235/462.03 |

FOREIGN PATENT DOCUMENTS

| | | |
|---|---|---|
| DE | 299 12 499 U1 * | 2/2000 |
| JP | 1305495 | 12/1989 |
| WO | 97/09687 | 3/1997 |

* cited by examiner

Primary Examiner—Karl D. Frech
Assistant Examiner—Jared J. Fureman
(74) Attorney, Agent, or Firm—Roylance, Abrams, Berdo & Goodman, L.L.P.

(57) ABSTRACT

An identification device including a gem having detectable identification data formed thereon mountable on an object, the identification data being related to an identifying feature of the object.

9 Claims, 2 Drawing Sheets

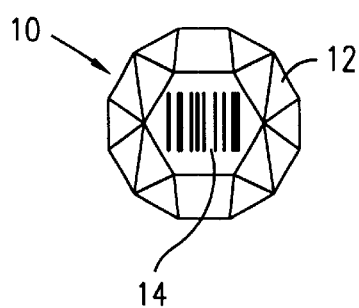
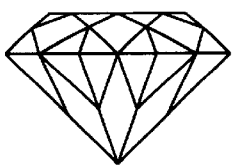
FIG. 1A  FIG. 1B
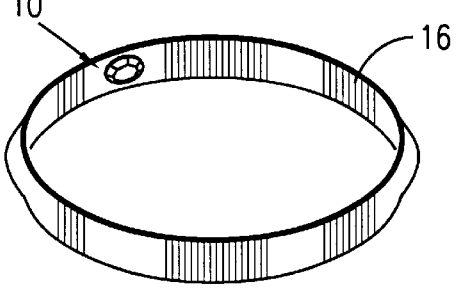
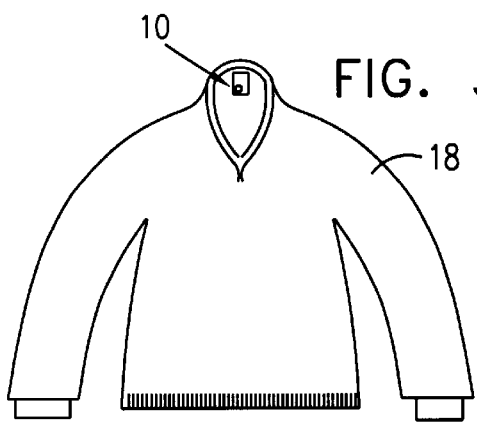
FIG. 2  FIG. 3
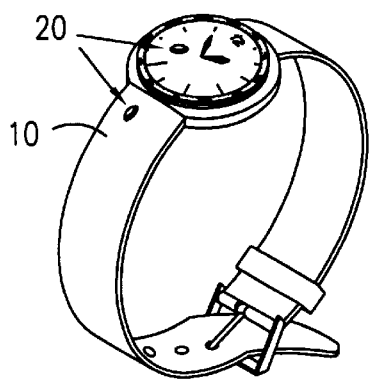
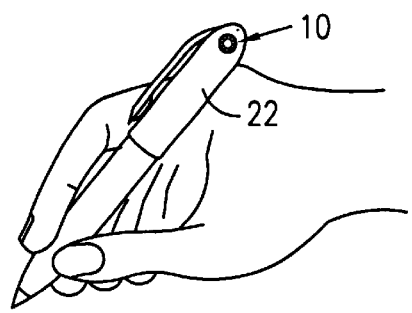
FIG. 4  FIG. 5
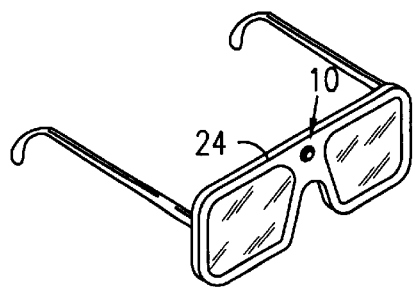
FIG. 6

IDENTIFICATION DEVICE

REFERENCE TO RELATED APPLICATION

This application is a continuation-in-part application of U.S. patent application Ser. No. 09/304,853 filed May 5, 1999 the contents of which are hereby incorporated by reference.

FIELD OF THE INVENTION

The present invention relates generally to apparatus for identification of objects, and particularly to a gem used as an identification device to identify another object.

BACKGROUND OF THE INVENTION

Apparatus and methods for identification of jewelry are well known. For example, identification information data may be etched, engraved or otherwise marked on a jewel to be identified. The identification information data may be related to dimensions, weight or material of the jewelry piece, purchase location and date, period of repair guarantee, and name and address of a purchaser or manufacturer, for example.

US Patents related generally to jewel identification include U.S. Pat. No. 1,700,497 to Heitzler, U.S. Pat. No. 1,799,604 to Read, U.S. Pat. No. 3,740,142 to Takubo, U.S. Pat. No. 3,947,120 to Bar-Issac et al., U.S. Pat. No. 4,012,141 to Hanneman, U.S. Pat. No. 4,125,770 to Lang, U.S. Pat. No. 4,200,506 to Dreschhoff et al., U.S. Pat. No. U.S. Pat. No. 4,316,385 to DeVries et al., U.S. Pat. No. 4,467,172 to Ehrenwald et al., U.S. Pat. No. 4,799,786 to Gerrard, U.S. Pat. No. 4,900,147 to Bowley et al., 5,118,181 to Yifrach et al., U.S. Pat. No. 5,124,935 to Wallner et al., U.S. Pat. No. 5,379,102 to Takeuchi, U.S. Pat. No. 5,410,125 to Winston et al., U.S. Pat. No. 5,485,312 to Homer et al., and U.S. Pat. No. 5,828,405 to Vanier et al.

It is important to note that all of the above patents deal with identifying the gem itself.

SUMMARY OF THE INVENTION

The present invention seeks to provide novel apparatus for identification of objects, wherein a gem is used as an identification device not to identify itself but rather to identify another object. The gem is marked with identification information data by means of laser etching, photo-etching, inscribing or any other suitable marking method. The markings may be on any portion of the gem, such as the facets, crown or table, for example. The identification information data may be related to dimensions, weight or material of the object to be identified, and the gem is set in some part of the object to be identified. The gem may or may not be hidden from view.

It is noted that throughout the specification and claims the term gem encompasses any precious or semiprecious stone or ornament, natural or synthetic. The terms gem, jewel and precious stone are used interchangeably.

There is thus provided in accordance with a preferred embodiment of the present invention an identification device including a gem having detectable identification data formed thereon mountable on an object, the identification data being related to an identifying feature of the object.

In accordance with a preferred embodiment of the present invention the identification data are optically detectable, such as a bar code.

Further in accordance with a preferred embodiment of the present invention the identification data are magnetically detectable.

There is also provided in accordance with a preferred embodiment of the present invention a method for identification of an object, including providing an object to be identified, forming detectable identification data on a gem, the identification data being related to an identifying feature of the object, and mounting the gem on the object.

In accordance with a preferred embodiment of the present invention the step of forming identification data includes recording data related to at least one of the following data: dimensions of the object, weight of the object, material of the object, purchase location, purchase date, period of repair guarantee, name of a purchaser, address of a purchaser, name of a manufacturer of the object, and address of a manufacturer of the object.

BRIEF DESCRIPTION OF THE DRAWINGS

The present invention will be understood and appreciated more fully from the following detailed description, taken in conjunction with the drawings in which:

FIGS. 1A and 1B are simplified top-view and side-view illustrations, respectively, of an identification device constructed and operative in accordance with a preferred embodiment of the present invention; and FIGS. 2–11 are simplified pictorial illustrations of examples of objects in which the identification device of FIGS. 1A and 1B is mounted, wherein the objects are as follows:

FIG. 2 is a simplified pictorial illustration of a ring;

FIG. 3 is a simplified pictorial illustration of an article of clothing;

FIG. 4 is a simplified pictorial illustration of a timepiece;

FIG. 5 is a simplified pictorial illustration of a writing instrument;

FIG. 6 is a simplified pictorial illustration of eyeglasses;

FIG. 7 is a simplified pictorial illustration of a cellular telephone;

FIG. 8 is a simplified pictorial illustration of a key;

FIG. 9 is a simplified pictorial illustration of a weapon;

FIG. 10 is a simplified pictorial illustration of a computer; and

FIG. 11 is a simplified pictorial illustration of a compact device (CD).

DETAILED DESCRIPTION OF A PREFERRED EMBODIMENT

Reference is now made to FIGS. 1A and 1B which illustrate an identification device 10 constructed and operative in accordance with a preferred embodiment of the present invention. Identification device 10 preferably includes a gem 12 having detectable identification data 14 formed thereon. Identification data 14 are related to an identifying feature of an object on which gem 12 can be mounted. Identification data 14 may be marked on gem 12 by any suitable method, such as, but not limited to, laser etching, photo-etching or inscribing. Identification data 14 may be on any portion of gem 12, such as the facets, crown or table, for example.

Identification data 14 may be marked by a manufacturer of the object to be identified, and may be related to dimensions, weight or material of the object to be identified, or name or address of the manufacturer, for example. Additionally or alternatively, identification data 14 may be marked by a retail or wholesale seller, and may be related to purchase location or date, period of repair guarantee, and name or address of a purchaser. Identification data 14 may be in any suitable form, such as, but not limited to, optically detectable data (readable by suitable OCR equipment, for example), a bar code, or magnetically recorded and detectable data (suitable for reading by a magnetic reading device).

Figure 7:
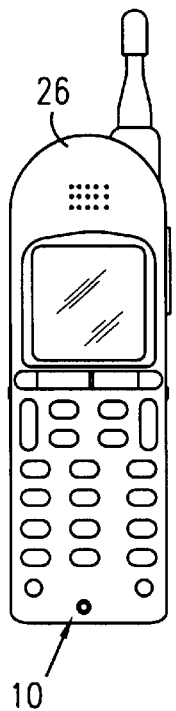
Figure 8:
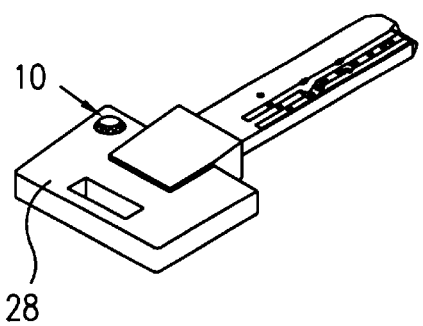
Figure 9:
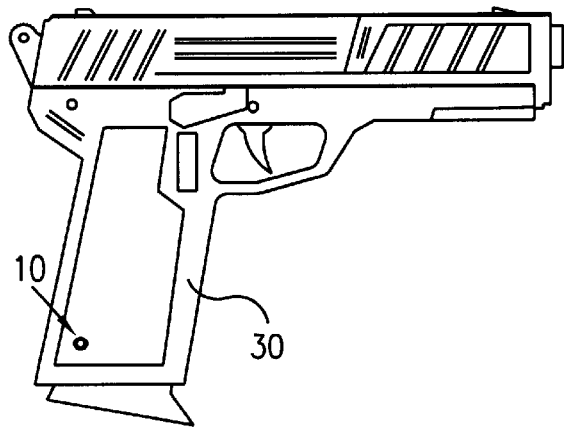
Figure 10:
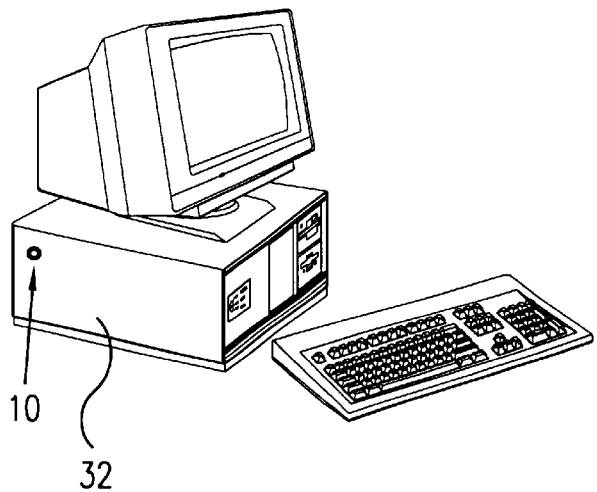
Figure 11:
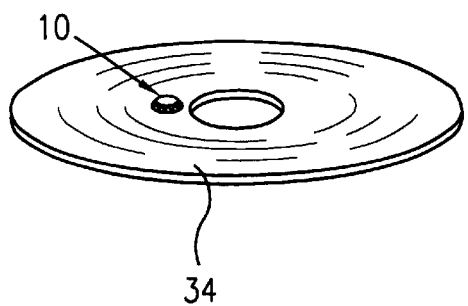

Reference is now made to FIGS. 2–11 which illustrate different examples of objects which can be identified. It is noted that in all these examples, gem 12 may or may not be hidden from view. FIG. 2 illustrates a ring 16 with identification device 10 embedded or set therein. FIG. 3 illustrates an article of clothing 18, such as a sweater, with identification device 10 sewn or bonded therein. FIG. 4 illustrates a timepiece 20, such as a watch, with identification device 10 attached to a strap or face of the watch. FIG. 5 illustrates a writing instrument 22, such as a pen, with identification device 10 attached to an outside surface thereof. FIG. 6 illustrates eyeglasses 24 with identification device 10 attached to a frame thereof. FIG. 7 illustrates a cellular telephone 26 with identification device 10 attached to a portion thereof, such as a portion of the mouthpiece. FIG. 8 illustrates a key 28 with identification device 10 attached to a portion thereof, such as the head of the key. FIG. 9 illustrates a weapon 30, with identification device 10 attached to a handle thereof. FIG. 10 illustrates a computer 32 with identification device 10 attached thereto. FIG. 11 illustrates a compact device (CD) 34 with identification device 10 attached to an inner portion thereof. The identification data 14 may be related not only to the CD 34 but also to the software.

It is readily appreciated that the above are merely some examples of objects which can be identified with identification device 10, and the scope of the invention is not limited to these examples.

It will be appreciated by persons skilled in the art that the present invention is not limited by what has been particularly shown and described hereinabove. Rather the scope of the present invention includes both combinations and subcombinations of the features described hereinabove as well as modifications and variations thereof which would occur to a person of skill in the art upon reading the foregoing description and which are not in the prior art.

What is claimed is:

1. A protected object comprising:
an object having a recess formed therein; and
a gem, having detectable identification data formed thereon, disposed in said recess so as to be hidden from view during normal use of said object, said gem being other than a display jewel and having said identification data etched therein, said gem being embedded within said object.

2. The object according to claim 1 wherein said identification data are optically detectable.

3. The object according to claim 1 wherein said identification data comprise a bar code.

4. The object according to claim 1 wherein said identification data comprise magnetically recorded data suitable for reading by a magnetic reading device.

5. The object according to claim 1 wherein said gem comprises an integrated circuit with electrical contacts that are connectable to an electronic readout device.

6. The object according to claim 1 wherein said gem comprises a bead with said identification data formed on an outside surface thereof.

7. The object according to claim 1 further comprising a seal which seals said gem in said recess.

8. A method for object identification comprising:
providing an identification device comprising a gem;
forming detectable identification data on said identification device;
forming a recess in an object; and
placing said identification device in said recess so as to be hidden from view during normal use of said object, and wherein
said identification device comprises a gem other than a display jewel;
said identification data is formed onto said identification device by being etched therein; and
said identification device is embedded within said object.

9. The method according to claim 8 wherein the step of forming identification data comprises recording data related to at least one of the following data: dimensions of the object, weight of the object, material of the object, purchase location, purchase date, period of repair guarantee, name of a purchaser, address of a purchaser, name of a manufacturer of the object, and address of a manufacturer of the object.

\* \* \* \* \*